United States Patent
Schmidt et al.

(10) Patent No.: US 10,311,381 B2
(45) Date of Patent: Jun. 4, 2019

(54) TOOL AND METHOD FOR CONDUCTIVE TRACE GENERATION IN A 3D MODEL FOR A HYBRID ELECTRO-MECHANICAL 3D PRINTER

(71) Applicant: Autodesk, Inc., San Rafael, CA (US)

(72) Inventors: Ryan Michael Schmidt, Toronto (CA); Daniel Matthew Taub, Somerville, MA (US); Baoxuan Xu, Vancouver (CA); Karl Willis, Millbrae, CA (US)

(73) Assignee: Autodesk, Inc., San Rafael, CA (US)

( * ) Notice: Subject to any disclaimer, the term of this patent is extended or adjusted under 35 U.S.C. 154(b) by 518 days.

(21) Appl. No.: 14/968,283

(22) Filed: Dec. 14, 2015

(65) Prior Publication Data

US 2016/0167311 A1 Jun. 16, 2016

Related U.S. Application Data

(60) Provisional application No. 62/100,424, filed on Jan. 6, 2015, provisional application No. 62/091,407, filed on Dec. 12, 2014.

(51) Int. Cl.

| | |
|---|---|
| *G06Q 10/00* | (2012.01) |
| *G05B 19/4099* | (2006.01) |
| *H05K 1/18* | (2006.01) |
| *G06F 17/50* | (2006.01) |
| *B33Y 50/00* | (2015.01) |

(52) U.S. Cl.
CPC ............ *G06Q 10/00* (2013.01); *B33Y 50/00* (2014.12); *G05B 19/4099* (2013.01); *G06F 17/50* (2013.01); *G06F 17/5068* (2013.01); *H05K 1/18* (2013.01); *G05B 2219/35134* (2013.01); *G05B 2219/49007* (2013.01); *Y02P 90/265* (2015.11)

(58) Field of Classification Search
CPC ...... G05B 19/4099; G05B 2219/49007; G05B 2219/35134; B33Y 50/00; G06F 17/5068; Y02P 90/265
See application file for complete search history.

(56) References Cited

U.S. PATENT DOCUMENTS

| | | | |
|---|---|---|---|
| 5,278,442 A * | 1/1994 | Prinz ....................... | B22F 3/115 257/417 |
| 7,818,089 B2 | 10/2010 | Hanna et al. | |
| 8,645,900 B2 * | 2/2014 | Schroeder ........... | G06F 17/5045 716/104 |
| 9,345,147 B2 | 5/2016 | Doyle | |
| 9,395,718 B1 | 7/2016 | Church et al. | |
| 9,744,727 B2 | 8/2017 | Willis | |
| 2004/0075655 A1 * | 4/2004 | Dunnett .................. | G06T 17/20 345/418 |
| 2011/0096313 A1 | 4/2011 | Bagheri et al. | |

(Continued)

FOREIGN PATENT DOCUMENTS

EP 2 706 559 3/2014

*Primary Examiner* — Ajay Ojha
(74) *Attorney, Agent, or Firm* — Fish & Richardson P.C.

(57) ABSTRACT

Methods, systems, and apparatus, including medium-encoded computer program products, for combining electronic circuitry with mechanical structures using a design tool to build hybrid electro-mechanical three-dimensional circuits for 3D printed devices. In some implementations, the design tool facilitates creation and placement of components and traces, and print preparation for additive manufacturing systems.

24 Claims, 12 Drawing Sheets

(56) References Cited

U.S. PATENT DOCUMENTS

| | | | |
|---|---|---|---|
| 2014/0291886 A1* | 10/2014 | Mark | B29C 64/106 |
| | | | 264/163 |
| 2015/0064299 A1* | 3/2015 | Koreis | G06Q 30/0603 |
| | | | 425/375 |
| 2016/0324006 A1* | 11/2016 | Vetter | H05K 3/0005 |
| 2017/0042034 A1* | 2/2017 | MacCurdy | H01L 27/01 |
| 2017/0348916 A1 | 12/2017 | Willis | |

* cited by examiner a) before remove the overlapping area of the socket slice b) after remove the overlapping area with the slice of terminal at layer n a) before remove the overlapping area of the socket slice b) after remove the overlapping area with the slice of terminal at layer n

TOOL AND METHOD FOR CONDUCTIVE TRACE GENERATION IN A 3D MODEL FOR A HYBRID ELECTRO-MECHANICAL 3D PRINTER

CROSS-REFERENCE TO RELATED APPLICATIONS

This application claims priority to U.S. Provisional Application No. 62/100,424, filed on Jan. 6, 2015, and U.S. Provisional Application No. 62/091,407, filed on Dec. 12, 2014. The disclosures of the prior applications are considered part of and are incorporated by reference in the disclosure of this application.

BACKGROUND

This specification relates to three dimensional (3D) printing.

3D printing is evolving towards the creation of complex, functional objects. The design and additive fabrication of hybrid electro-mechanical structures promises to enable closer integration between electrical and mechanical functionality. Unlike contemporary devices, that house electronic circuitry within a separate mechanical shell, 3D printing promises the potential to embed electronics entirely within the mechanical structure of the device itself.

SUMMARY

This specification describes technologies relating to 3D printing. A hybrid electro-mechanical 3D printer offers a number of advantages, including the following: (1) customization—as an entire device can be fabricated in a single 3D printer without the need for tooling, individual devices can be customized simply by modifying the digital design files; (2) rapid prototyping—decrease the turnaround time from device design to testing and end use; (3) compact form—circuitry embedded into the walls of a device can replace the need for dedicated circuit boards and greatly reduce the overall device size; (4) physically robust—embedded circuitry can utilize the mechanical strength of the surrounding materials to better resist strain and contamination (e.g., water, dirt); and (5) new 3D possibilities—three-dimensional circuits enable new possibilities not previously possible with planar design, including high performance antennas and unique sensors.

The development of a sophisticated software design tool that can combine electronic circuitry with mechanical structures can help in fully utilizing the above advances. This invention addresses aspects of designing hybrid electro-mechanical three-dimensional circuits for 3D printed devices. A design tool can be provided to empower the creation of 3D printed electronic devices. Specifically, the design tool can allow a user to design the circuitry to meet particular requirements. Recent advances in materials science have enabled the combination of high conductivity silver inks with standard 3D printing plastics. A design tool, as described herein, can provide electronics and 3D printing enthusiasts with the ability to design 3D circuits for the first time. These 3D circuits can then be fabricated into unique electronic devices.

The design tool can be part CAD (computer aided design) for designing three dimensional structures (e.g., using B-reps, voxels, etc.) and part circuit design tool. 3D printed objects created with such a hybrid design tool can have mechanical and electrical functionality. Although a hybrid tool, such a tool can also excel in a new area unsupported by existing tools, namely, 3D wiring. Thus, users can be enabled to connect electrical components in 3D space so they can be printed as physical objects.

The details of one or more embodiments of the subject matter described in this specification are set forth in the accompanying drawings and the description below. Other features, aspects, and advantages of the invention will become apparent from the description, the drawings, and the claims.

DETAILED DESCRIPTION

Figure 1:
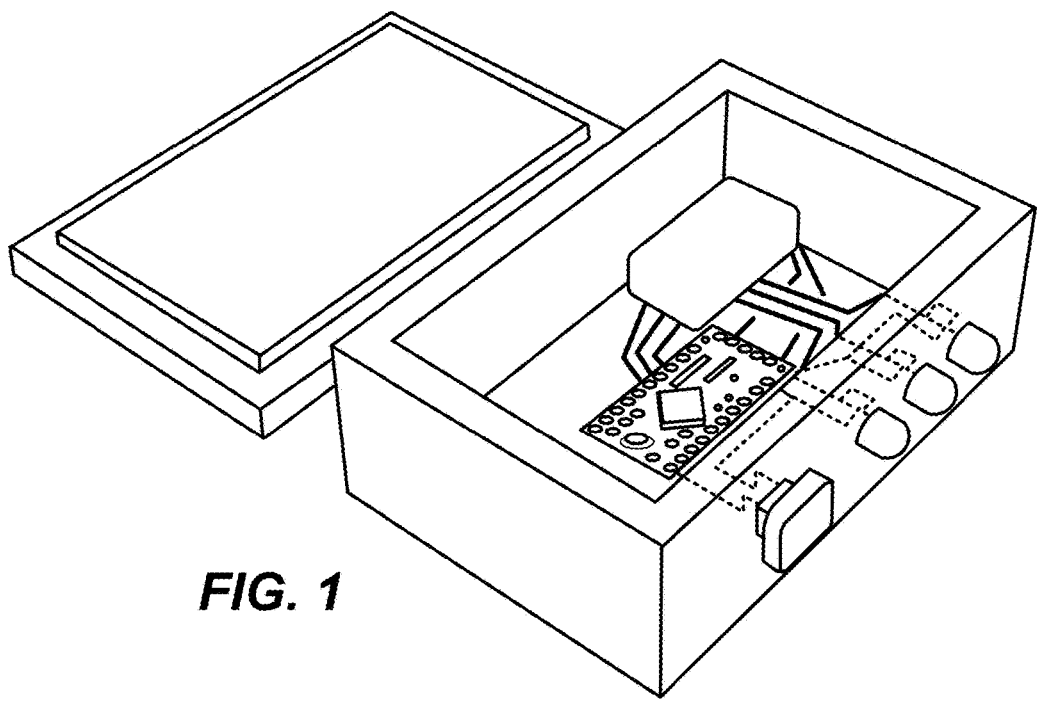
FIG. 1 shows how a design tool can enable connection of existing PCBs (printed circuit boards) to embedded components in a user designed 3D printed device.

FIG. 1 shows how a design tool can enable connection of existing PCBs (printed circuit boards) to embedded components in a user designed 3D printed device. Three main areas can be covered in the design tool: Components, Traces, and Print Preparation. For components, the design tool can contain a library of components that are placed by the user on an imported mechanical CAD model. Described in more detail below is how the components are designed, placed, and connected electrically and mechanically.

Component design: Components can be represented in a data structure that stores mechanical, electrical, and meta data. The mechanical data can consist of geometry representing the body of the component and each of its electrically conductive terminals. Both the body and terminal data can be addressed separately. Multiple sets of mechanical data may be present in a single component.

Figure 2:
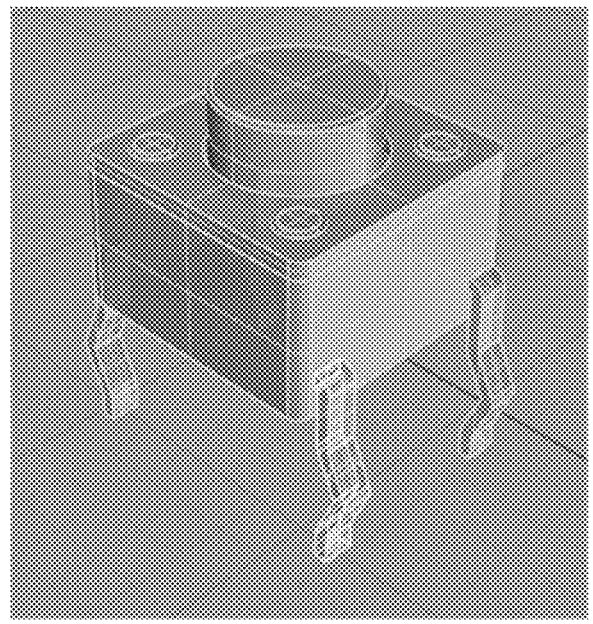
FIG. 2 shows an example component with geometry representing each separate terminal.

FIG. 2 shows an example component with geometry representing each separate terminal. Electrical data can be stored that represents the electrical characteristics of the component related to connectivity, resistance, impedance, etc. Meta data can also be stored that may relate to the physical appearance of the component or its manufacturer and so on.

An example of an ASCII data structure in JSON format is shown below.

```
"npnTransistor": {
   "name": "NPN Transistor (BJT)",
   "description": "A bipolar junction used for amplifying or switching
electronic signals. This type of BJT (Bipolar Junction) needs a positive current in
the base terminal.",
   "tags": [
      "transistor",
      "logic"
   ],
   "package": [
      {
         "name": "TO-92",
         "model": "/components/obj/IC_TH_TO-92.obj",
         "image": "/components/img/IC_TH_TO-92.png"
      },
      {
         "name": "TO-220-3",
         "model": "/components/obj/IC_TH_TO-220-3.obj",
         "image": "/components/img/IC_TH_TO-220-3.png"
      }
   ],
   "model": [
      {
         "normals": [ [x,y,z],[x,y,z],[x,y,z],[x,y,z],[x,y,z] ],
         "vertices": [ [x,y,z],[x,y,z],[x,y,z],[x,y,z],[x,y,z] ],
         "indices": [ [0,1,2], [2,1,3], [0,2,3] ],
      },
      {
         "normals": [ [x,y,z],[x,y,z],[x,y,z],[x,y,z],[x,y,z] ],
         "vertices": [ [x,y,z],[x,y,z],[x,y,z],[x,y,z],[x,y,z] ],
         "indices]: [ [0,1,2], [2,1,3], [0,2,3] ],
      }
   ]
   "trace]: [
      {
         "normals": [ [x,y,z],[x,y,z],[x,y,z],[x,y,z],[x,y,z] ],
         "vertices": [ [x,y,z],[x,y,z],[x,y,z],[x,y,z],[x,y,z] ],
         "indices": [ [0,1,2], [2,1,3], [0,2,3] ],
      }
   ]
}
```

Binary versions may also be used. In the above example, the model node contains a geometric description of the standard "model" material. The trace node contains a similar description for a conductive material.

Printed components: As well as typical (mass-produced) components that are inserted into the printed object, "printed components" are printed in their entirety. Printed components can be stored, created, and placed within design tool. These components are printed in their entirety and form a digital representation of an electro-mechanical assembly.

Figure 3:
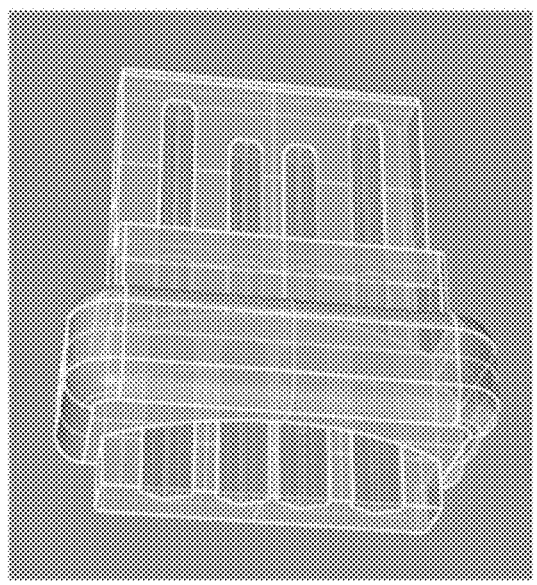
FIG. 3 shows an example printed component, a USB connector.

A simple example of a printed component is a USB connector, shown in FIG. 3. The purpose of this component is to connect to standard female USB A port. The printed component is a male connector printed with both structural (plastic) and electrical (conductive) materials. This component can be added to a design to power a circuit or provide data communications.

Based on the orientation of the printed component, the design may change to optimize its mechanical and electrical properties. For example, the USB connector relies on the conductive traces being located on the top surface (i.e., they must be supported by a layer of plastic underneath). If the model is rotated, the layout of the traces may change automatically to ensure the conductive traces are upward facing. In some embodiments, the design tool may automatically change the layout of one or more electrical traces in the printed component in response to changing the orientation of one or more components. In some embodiments, in response to changing the orientation of one or more of the components, the design tool may prompt the user to change the layout of one or more electrical traces.

Figure 4:
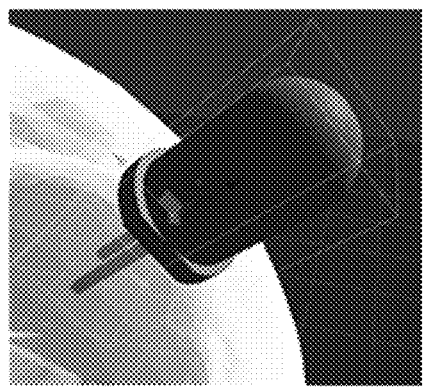
FIG. 4 shows an example component placed on the surface of a model.

Component placement: Components can be positioned and orientated in relation to an imported mechanical CAD model. When manually placing components, they can be orientated on a model automatically, based on the geometry of the model surface. When the cursor is positioned on the model, the intersection point can be calculated by casting a ray onto the model. Data structures, such as an Octree, can be used to accelerate the calculation of intersection. Octree may be used to store triangles of objects to query triangles in a specific area of space. By using Octree only a subset of the triangles of the entire scene is used to calculate the intersection, thus speeding up the intersection test. The location of the intersection point can be used as a reference point to place the component. The normal of the intersected triangle can be used as the Z direction of the local frame of the component. FIG. 4 shows an example component placed on the surface of a model.

Automatic placement: Components can be placed automatically throughout the model based on preset parameters, such as minimum/maximum distance, coplanar constraints, based on their electrical connectivity, or based on minimization or amplification of electromagnetic transmission. Components can also be constrained to slice planes in the same way as described below for traces.

Electrical traces (or wires) are used to connect components together and form a circuit. The design tool can enable circuits to be designed in 3D space by taking advantage of multi-material 3D printing. Manual traces can be supported. Traces can be drawn manually by the user to follow the surface of the CAD model or align to a given slice plane within the model. Additionally, trace control points can be positioned at arbitrary locations in 3D space. For example, a user may draw a trace by moving a cursor across the model, either as freehand drawing or by clicking on control maps. The trajectory can then be mapped either to the surface of the CAD model or to a specified slice. The trajectory may first be interpolated by smooth spline in order to avoid sharp corners.

Figure 5:
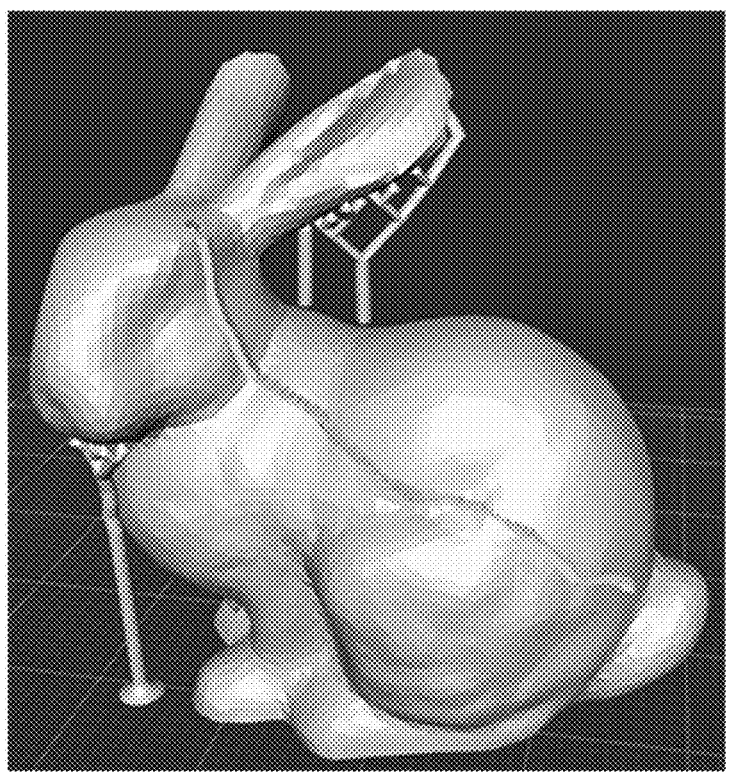
FIG. 5 shows an example of a surface trace.

Surface traces can also be supported. An example surface trace is shown in FIG. 5. To create control points, a ray can be cast from the cursor location on to the model. When the user creates more than one control point, a smooth polyline can be interpolated by an algorithm such as a Catmull-Rom spline. Then all sampled vertices in the spline can be projected to the nearest points on the model's surface respectively to create the trace on the surface.

Slice plane traces can also be supported. The design tool can allow the user to draw traces through the volume of the object through the use of Slice Planes. Just as a plane is defined by a normal and an offset, the user can define a slice plane in the scene by setting the orientation of the normal and moving the plane along the normal to set the offset. Slice Planes are usually oriented in parallel along a given dimension, for example, "Z" or "up," but it would work equally well as an interface technique with a vector such as "20 degrees to X from Z." Once a slice plane is selected, all traces drawn will be constrained to that plane, with the exception of features such as components or antennas that span multiple planes. In these cases, manually or automatically-detected points on the components may be used. For example, the centroid, top point, bottom point, etc., of the component itself or of only the conductive parts of the component may be used. During this process, the design tool can assist with optimizing for various electromagnetic characteristics based on inputted formulae or simulations based on physical models. Drawing traces on the slice plane is similar to drawing on a 2D canvas. The user can either draw the trace manually or use the control point-based tool to create the trace. All the control points are mapped to the slice plane. Drawing in plane, depending on the printer, has the advantage of enabling greater conductivity as continuous traces can be created in a single layer. These layers can be connected to complete the electrical design.

A single slice plane in the "up," or Z, direction has a thickness equal to the current slice thickness. This thickness may be varied. The thickness value is used during the preliminary contour generation procedure. In one example, if the slice plane is not perpendicular to the "up" direction, there are two options: a) constrain the points to each discrete slice height, or b) use continuous coordinates on the angled plane. If continuous coordinates on the angled plane are used, even if the coordinates are continuous, there is still an option to discretize the traces. An anti-aliasing-like approach may be used to approximate continuous layering.

Grid traces can also be supported. By combining multiple directions of slice planes, we can create a grid that, when projected to a screen, provides an interactive representation of a three-dimensional space in two dimensions. Traces or components may be oriented to this grid as an extension to the method described above regarding slice planes. Interacting with a grid of planes is similar to interacting with multiple model surfaces; when the cursor moves across, it can highlight the selected plane, and clicking creates a point on the hovered plane or intersection. When slice planes intersect, placement is further constrained. The intersection of two planes provides a line along which control points may be placed. A third plane as a constraint specifies a point, whereas combinatorially, planes may be put in groups of two or three to create multiple constraining lines and/or points for trace placement.

Automatic traces can also be supported. Manually drawing the curves that can be discretized into traces is a tedious process. Hence, it is desirable to automate this as much as possible. We envision a variety of strategies for doing so, which are grouped into several categories: (1) interactive methods defined by user input; (2) schematic-based methods; and (3) context-based methods.

For the first of these (interactive methods defined by user input), the user can select two components, and the trace path can be automatically determined, either along the surface or inside the object. The path would be generated by auto-routing algorithms, which could minimize different properties such as curvature, orthogonality, or vertical planarity (to maximize the portions of the trace that lie in the same 3D-printing slices). The user can select two terminals, and the trace path can be automatically determined. The user can also draw the 2D projection of the trace from a specific viewpoint, and the system can automatically determine a suitable 3D path that best matches the 2D projection but satisfies the constraints on the trace. A suggestive interface can be provided, where the system generates potential options for either an entire trace, or sequential sections of a trace, and the user can easily make a choice simply by clicking on the desired option. Finally, the user could "over-sketch" an initial trace to re-shape it into the desired path.

For the second category of strategies (schematic-based methods), the user can import a schematic and then drag-and-drop the components of the schematic into/onto the 3D model. The schematic traces can then be transferred via auto-routing. Further, the user can import a schematic and the system can automatically place both components and traces. For example, if the model has two parts labeled "eyes," and the schematic has two Light Emitting Diodes (LEDs), the LEDs can be automatically associated to the eyes, and positioned appropriately. This would involve some kind of semantic model, but it could be simpler to author such a model than to manually place the components.

For the third category of strategies (context-based methods), the user can place components and the system can automatically generate one or more suitable traces to connect them. This may require something like an underlying expert system or data-driven model. For example, I could position two LEDs and a battery, and the system would automatically generate connection traces (and even insert necessary tertiary components, such as resistors). If the "function" of the object was known, a data-driven system could map similar sets of components/traces onto the object. This could be applied in cases where the design tool is purpose-built to create specific types of objects.

Figure 6:
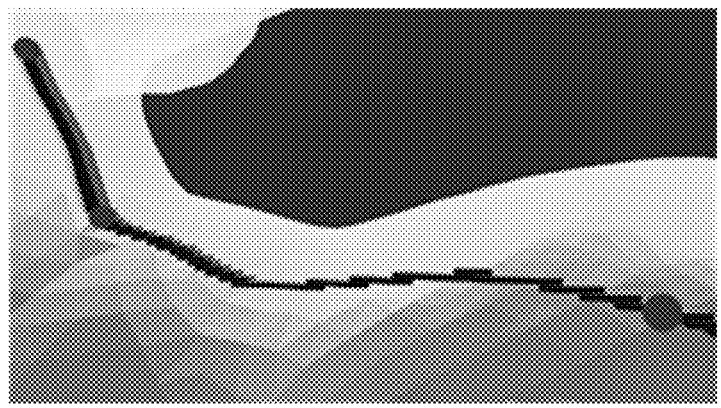
FIG. 6 shows an example of discretized trace.

Discretization can also be employed. In some implementations, geometry for 3D printing can be sampled as a discrete series of layers, also known as slices. Likewise, traces in design tool can be represented by higher order curves that get sampled into a discrete set of geometry for printing. To maintain electrical conductivity an algorithm can be used that determines the correct way to sample a trace. The trace can be discretized into trace slices aligned along the slice plane of the 3D printer. These slices can take different shapes, rectangular, circular etc. When two consecutive trace slices are on different slice planes, they can be arranged to always maintain contact between the previous/next trace above/below. The amount of overlap (between two consecutive trace slices) can be dynamically adjusted based on material and fabrication properties. FIG. 6 shows an example of discretized trace.

Figure 7:
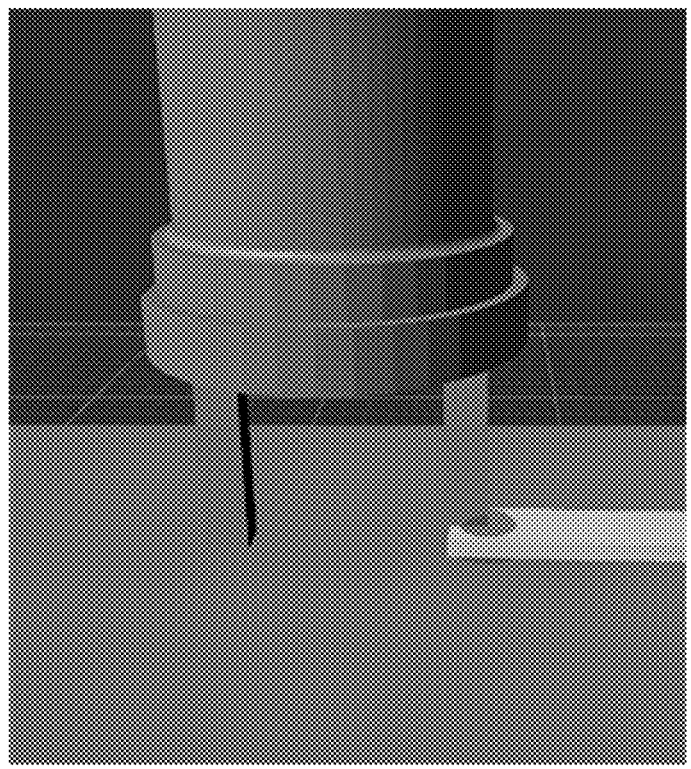
FIG. 7 shows an example of a component connection.

In some implementations, component connection can be supported in the following matter. FIG. 7 shows an example component connection. When moved into close proximity of a component, manually drawn traces can snap to the component terminal. The first step is to calculate the distance between the control point and all terminal meshes. The smallest distance can be picked, and if it is under a predefined threshold, then the control point can be snapped to the closest point on the terminal. Calculation of distance between a point and a mesh can be accelerated by a data structure such as an Octree.

Figure 8:
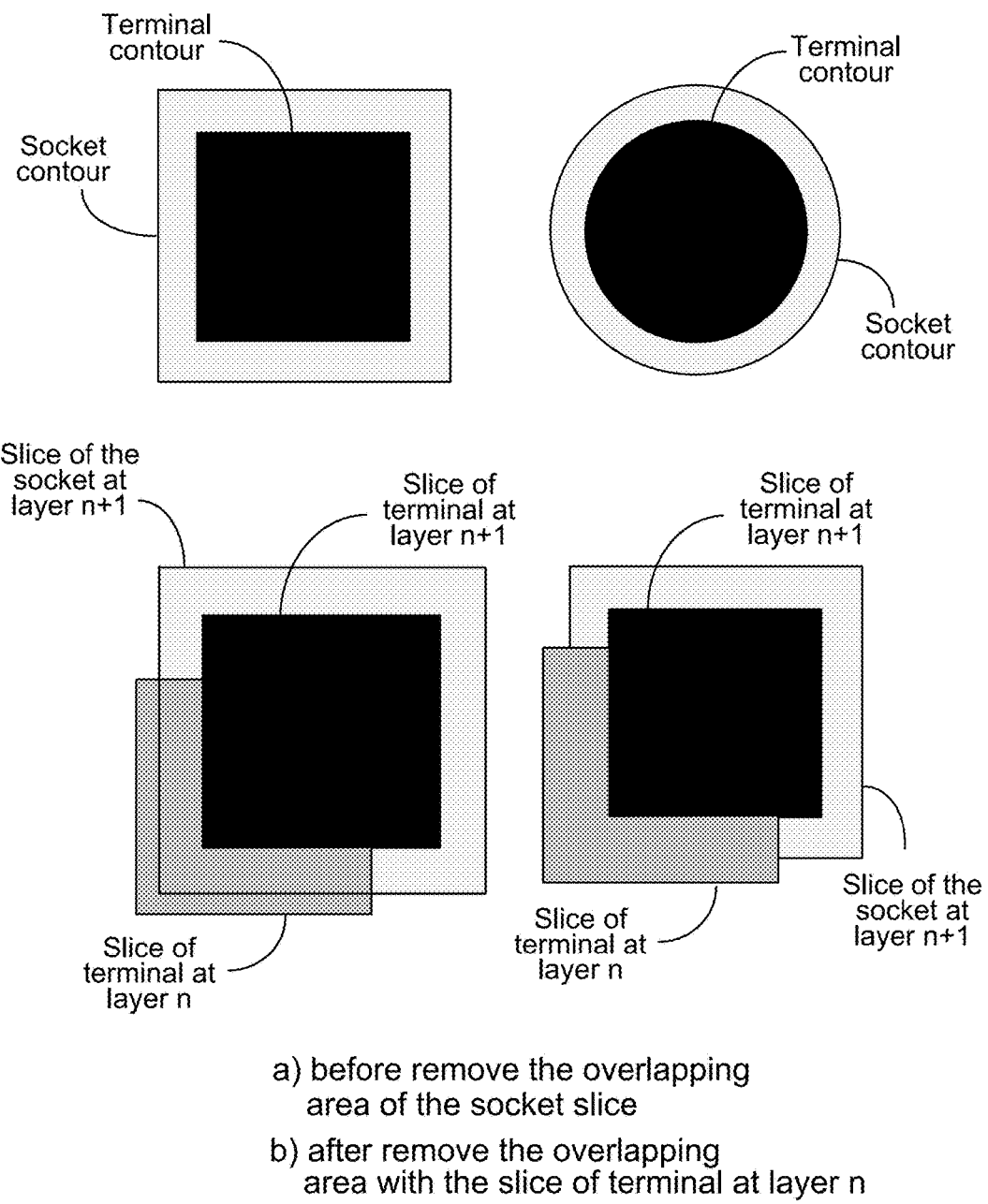
FIG. 8 shows an example of a techniques for creating a surrounding contour by offsetting a terminal contour.
Figure 9:
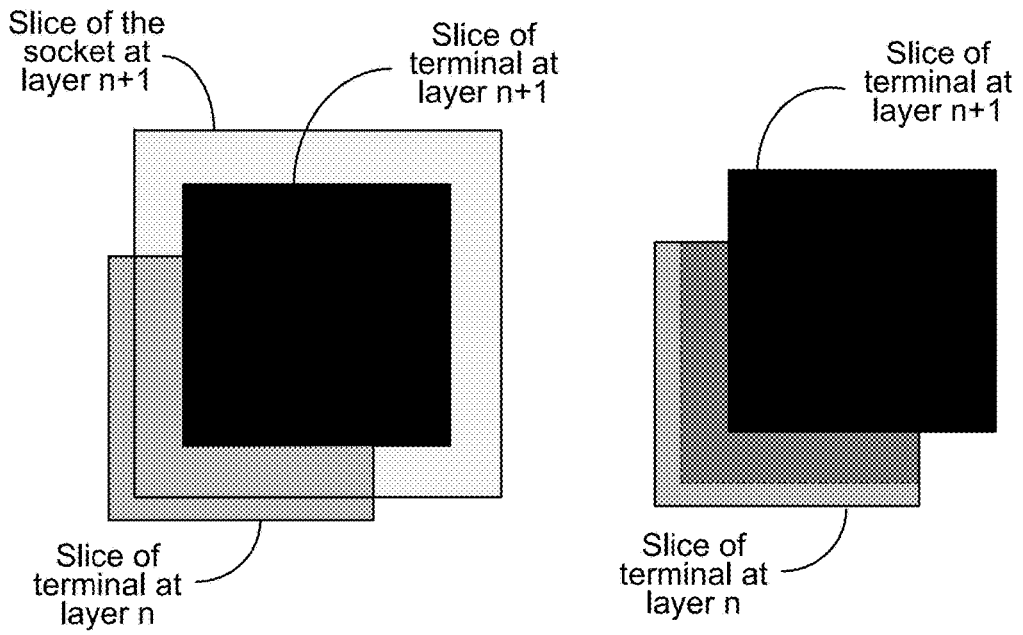
FIG. 9 shows an example of removing a non-overlapping area of a socket slice.

Automatic socket creation can also be supported. When components are inserted into a model, it is important to establish connectivity. To create optimal connectivity between traces and component terminals, a surrounding area of conductive material should be created. This can be done by looking at the slices of the terminal meshes. Generally a surrounding contour can be created by offsetting the terminal contour as shown in FIG. 8. Usually the terminal will not be inserted until the socket material is filled in, therefore the current slice of the socket cannot overlap with the slice of the terminal underneath. Therefore all overlapping areas must be removed for the current slice. This is applied for all slices of the socket material except for the bottom slice of the terminal mesh. There can be an opposite case where the inserted component model has the terminal above it. In such case the socket material is essentially filled on top of the terminal. Therefore the non-overlapping area of the socket slice should be removed in this case, as shown in FIG. 9.

Once the design of an electro-mechanical object has been completed, the data should be converted into a format ready for printing. This process can involve slicing the model, components, and traces to create a multi-material set of print instructions. In some implementations, this can involve component subtraction.

Components that will be inserted into the print can get subtracted from the main CAD model during the slicing process. The model and components can be sliced in the same step. The subtraction can be performed on the 2D slices using the 2D contours of the model and components. Alternatively it can be performed on the 3D data. Offsets can be applied to the components contour to make sufficient room for component insertion.

For trace insertion, the traces can also be subtracted from the model in a process similar to the components. The trace itself can have the terminal parts of the components subtracted from it. Offsets can be applied to the terminal contours to improve the mechanical fit. The overall formula for the Boolean operation can be:

model print=model−traces−components trace print=traces+component terminals

Figure 10:
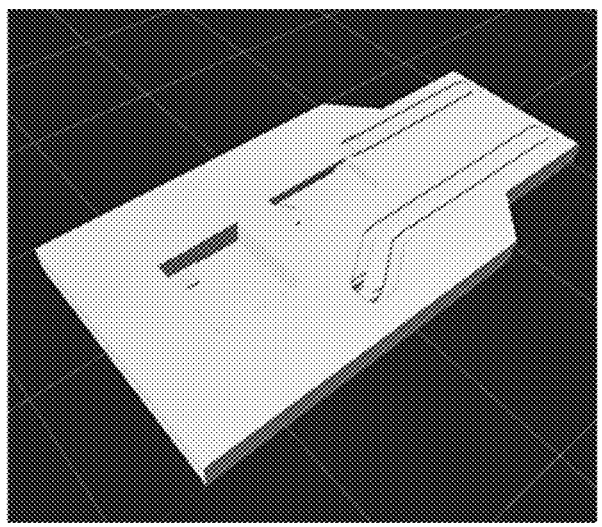
FIG. 10 shows an example of print preview that enables a user to visualize the final print.
Figure 11:
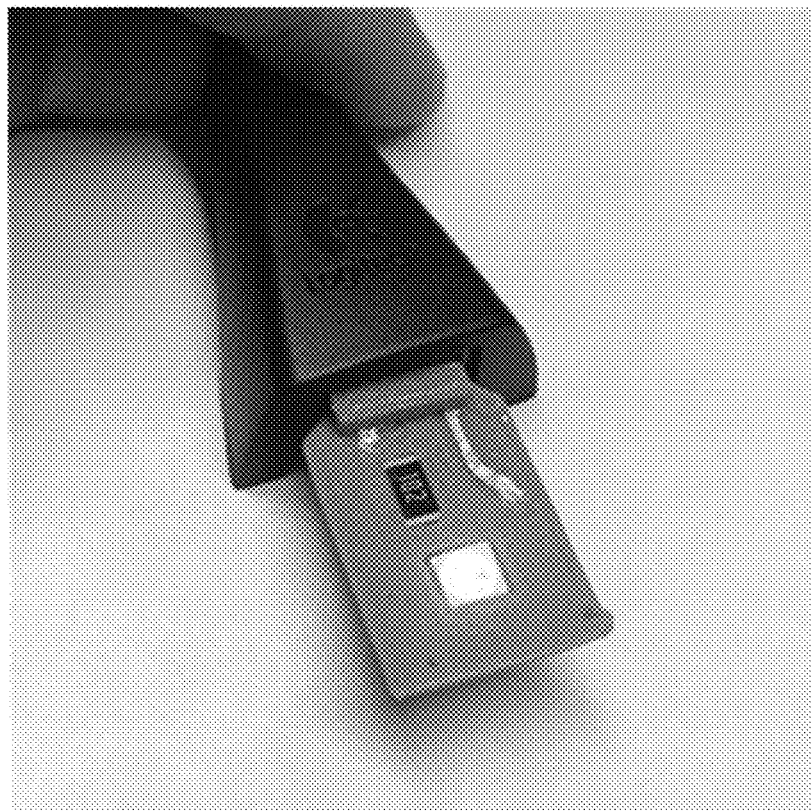
FIG. 11 shows an example of printed object wires connected and components inserted.
Figure 12:
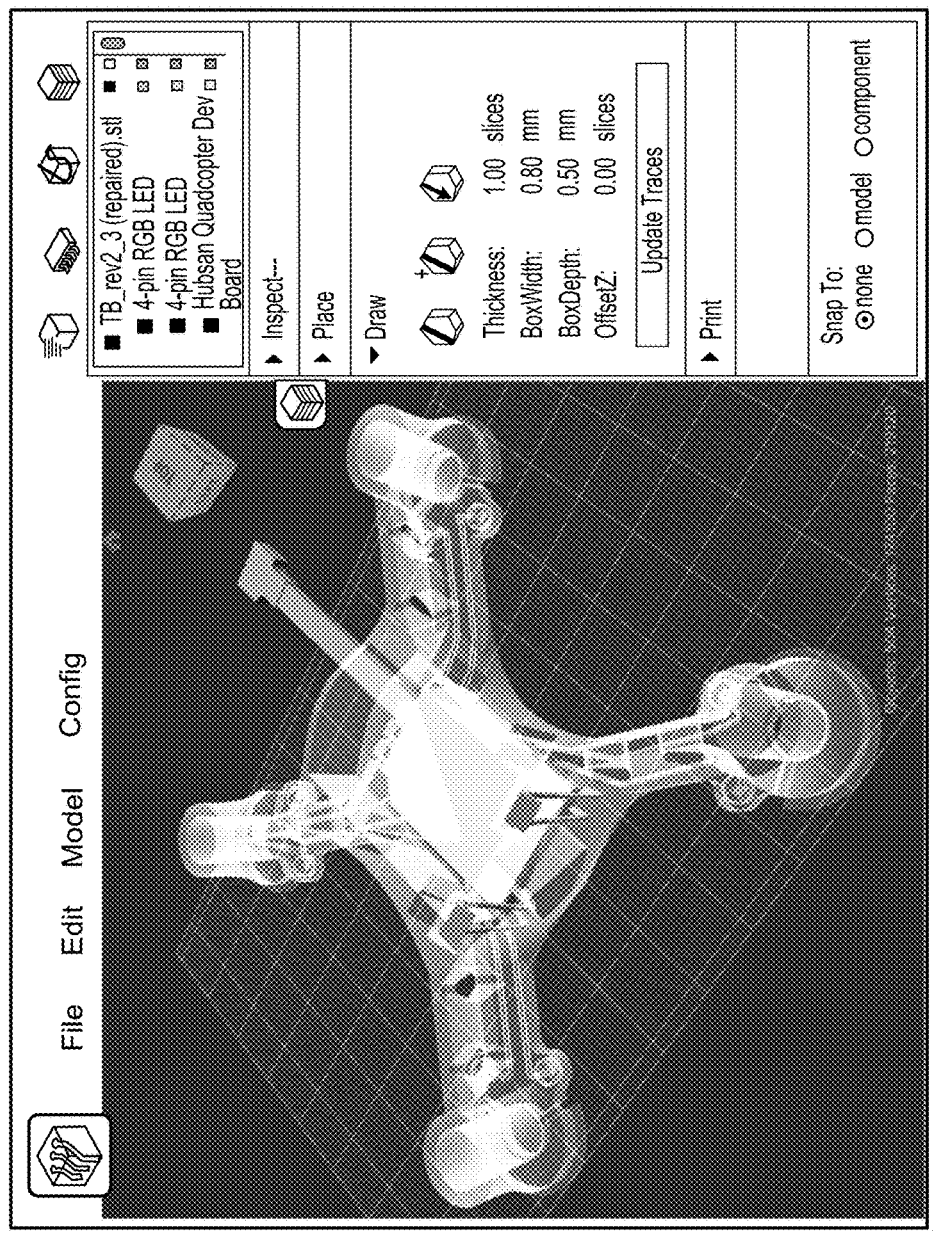
FIGS. 12-15 show an implementation using an example design tool to make a 3D printed object with embedded wiring.
Figure 13:
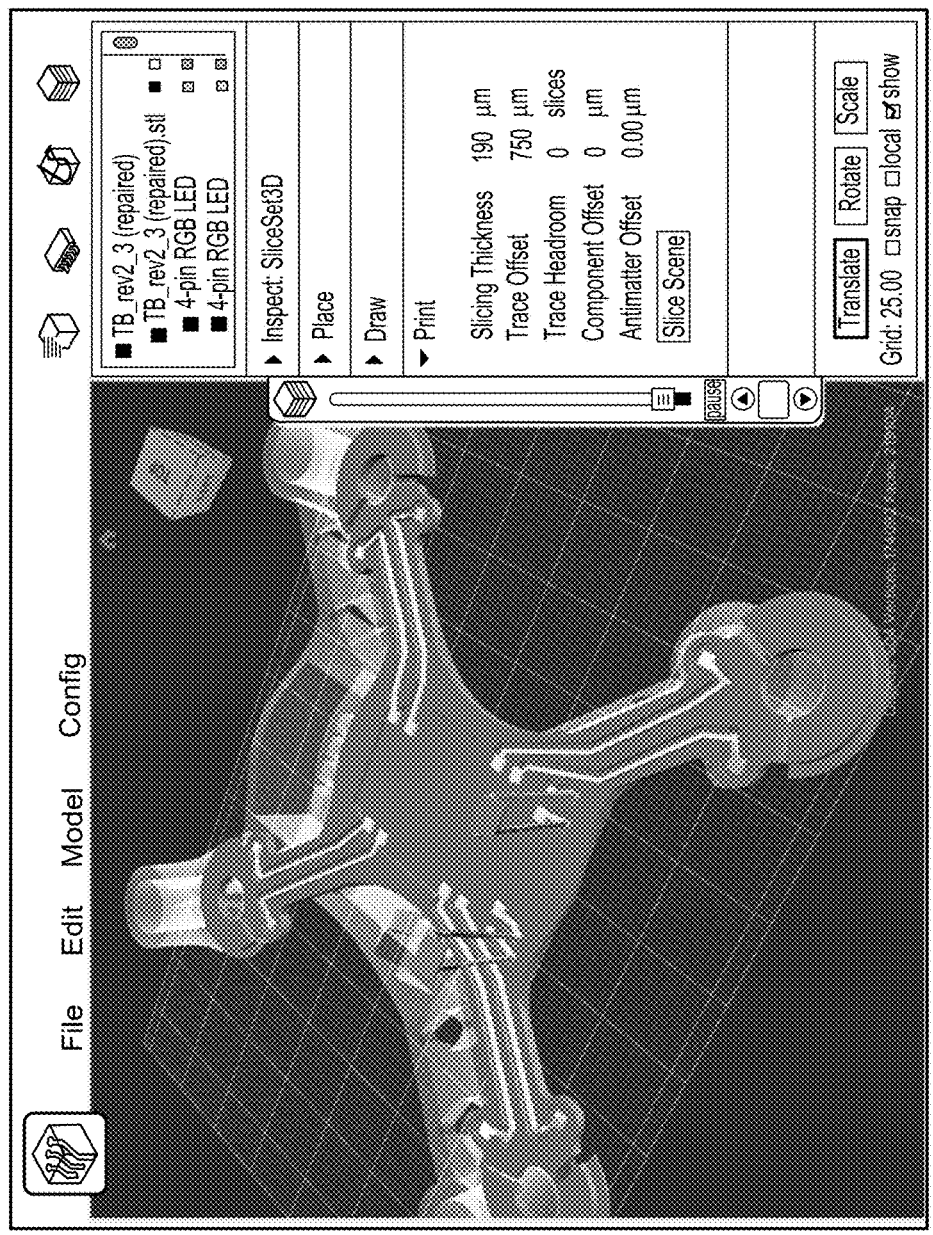
Figure 14:
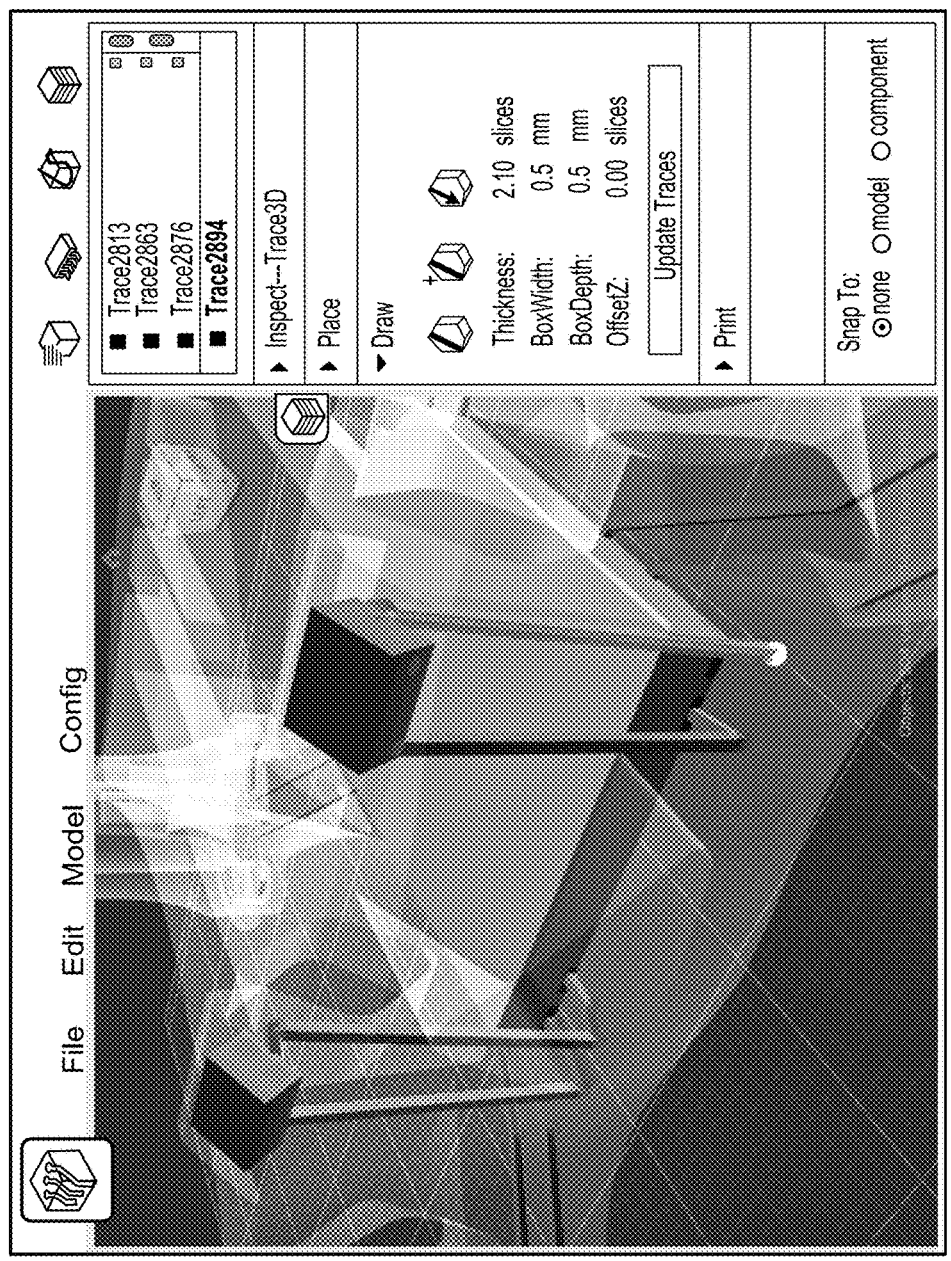
Figure 15:
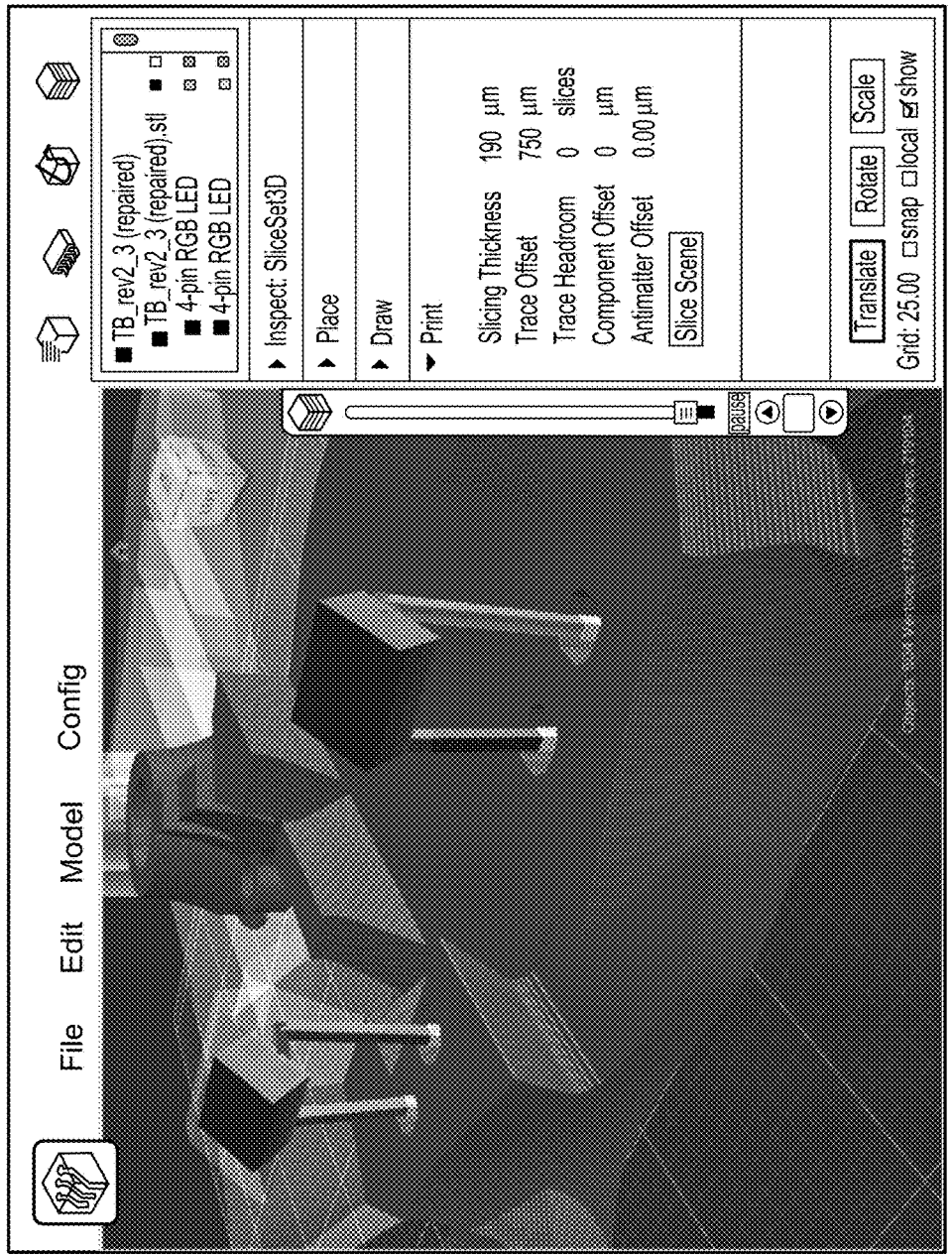

Printed components differ from regular components in that they are printed entirely, not inserted. Different Boolean operations apply because of this. A typical example would be:

model print=model+printed component model trace print=traces+printed component terminals To enable the user to understand what a print will look like, slice data can be used to render a visualization of the final object. A cross section of the design can be used to inspect and verify individual slices. The user can scroll through the individual slices by dragging on a slider or using other interface elements/shortcuts. FIG. 10 shows an example of print preview that enables a user to visualize the final print. FIG. 11 shows an example of printed object wires connected and components inserted.

When the print requires insertion of components or printed sub-parts into a model, the user may opt to manually or automatically choose points in the model's height for the printing process to wait and allow insertion of the parts by a person or machine. A pause may be for a set duration, until insertion has been verified with sensors (e.g., using a camera, infrared distance sensor, capacitive position sensor, etc.), or until a person or machine indicates that the insertion has been completed using, for example, a button, voice command, or gesture. The verification may be performed automatically. At this point, the print continues until the next pause point.

Pause points are inserted as a marker in the file based on the component positions and the approximate position is maintained independent of slice heights. Pausing may also be used to allow inspection of a print in progress or to hold position during a long print so that an operator may observe a portion of the printing process to ensure it does not have problems.

Figure 16:
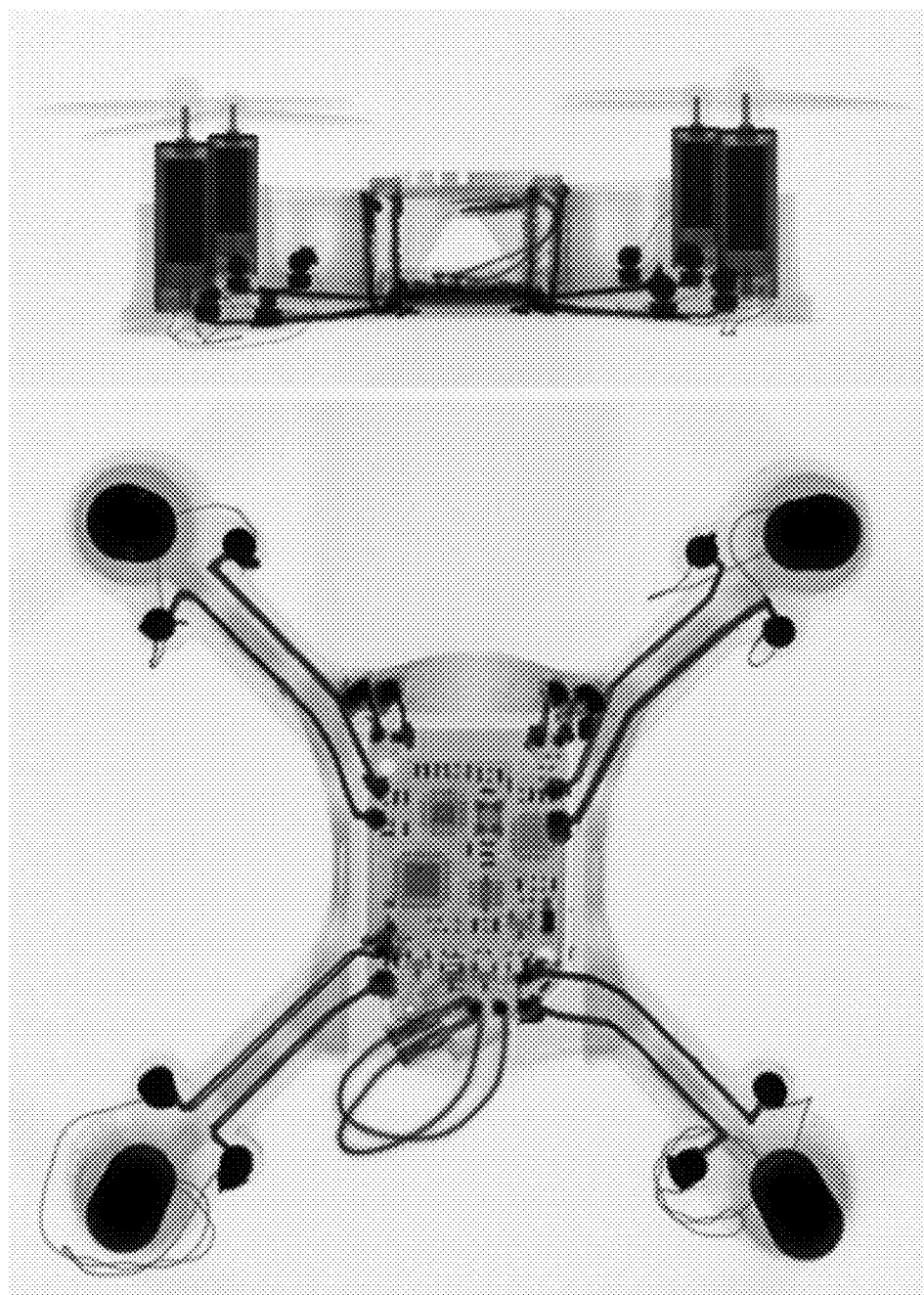
FIG. 16 shows an example computerize tomography (CT) scan of a final printed object (where the 3D wires inside the printed object can be seen) using the implementation shown in FIGS. 12-15.

FIGS. 12-15 show an implementation using an example design tool to make a 3D printed quadcopter with embedded wiring. FIG. 16 shows a CT scan of a final printed object made using the implementation of the design tool, shown in FIGS. 12-15. The CT scan of FIG. 16 clearly shows the 3D wires inside the final printed object can be seen.

Recent advances in materials science have enabled the combination of high conductivity silver inks with standard 3D printing plastics. For example, silver ink may be deposited layer by layer during the printing process. This process, however, makes it difficult to form continuous layers of silver ink in the Z direction. In some embodiments, various criteria is determined to overlap the layers of silver ink in a particular shape or geometry. For example, the layers of silver ink may be formed in the Z direction much like a staircase to ensure a continuous connection. In some embodiments, the plastic structure is first printed by the 3D printer, leaving gaps for the silver ink. The silver ink is later deposited in the gaps formed by the plastic.

Figure 17:
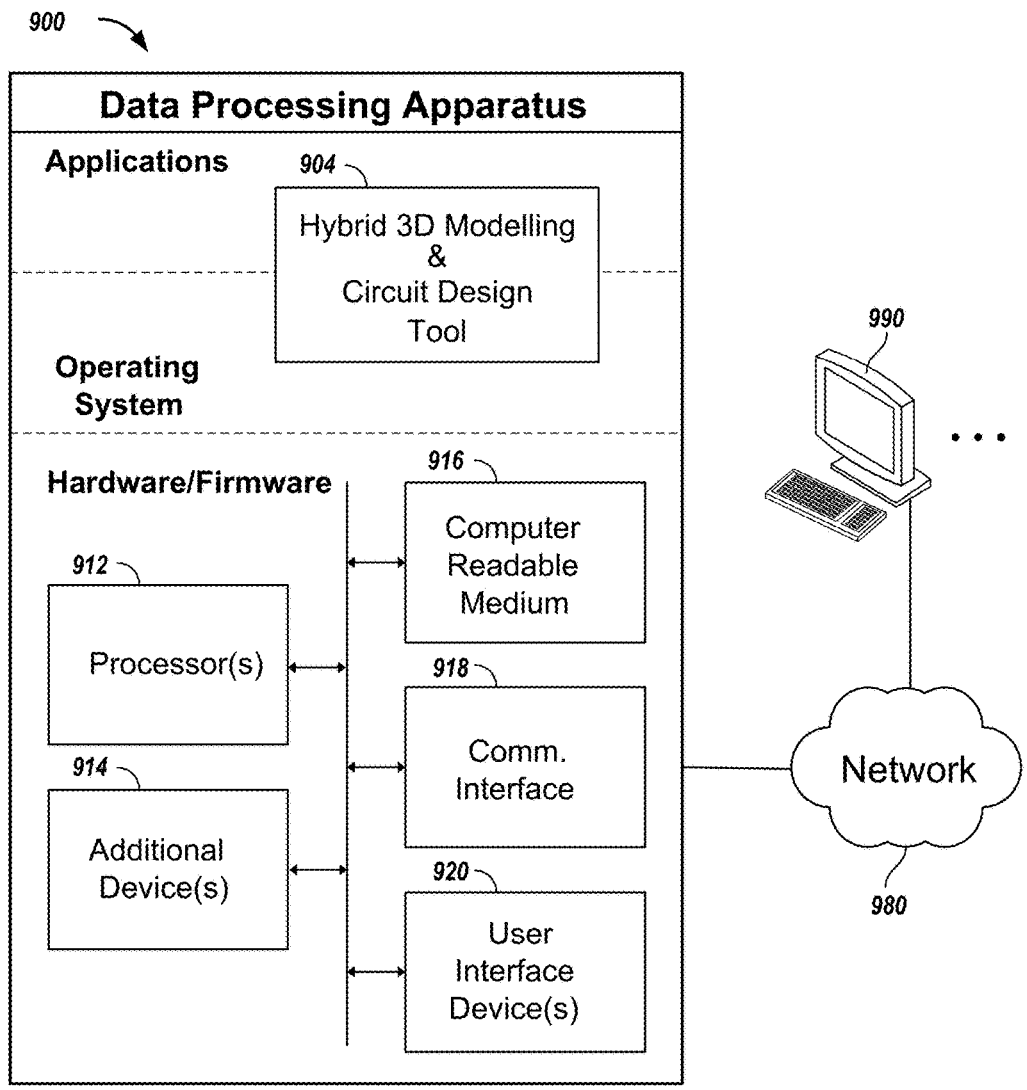
FIG. 17 is a schematic diagram of a data processing system.

FIG. 17 is a schematic diagram of a data processing system including a data processing apparatus 900, which can be programmed as a client or as a server. The data processing apparatus 900 is connected with one or more computers 990 through a network 980. While only one computer is shown in FIG. 17 as the data processing apparatus 900, multiple computers can be used. The data processing apparatus 900 includes various software modules, which can be distributed between an applications layer and an operating system. These can include executable and/or interpretable software programs or libraries, including tools and services of a hybrid 3D modeling and circuit design tool 904, such as described above. The number of software modules used can vary from one implementation to another. Moreover, the software modules can be distributed on one or more data processing apparatus connected by one or more computer networks or other suitable communication networks.

The data processing apparatus 900 also includes hardware or firmware devices including one or more processors 912, one or more additional devices 914, a computer readable medium 916, a communication interface 918, and one or more user interface devices 920. Each processor 912 is capable of processing instructions for execution within the data processing apparatus 900. In some implementations, the processor 912 is a single or multi-threaded processor. Each processor 912 is capable of processing instructions stored on the computer readable medium 916 or on a storage device such as one of the additional devices 914. The data processing apparatus 900 uses its communication interface 918 to communicate with one or more computers 990, for example, over the network 980. Examples of user interface devices 920 include a display, a camera, a speaker, a microphone, a tactile feedback device, a keyboard, and a mouse. The data processing apparatus 900 can store instructions that implement operations associated with the modules described above, for example, on the computer readable medium 916 or one or more additional devices 914, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A system comprising:
   a user interface device; and
   one or more computers operable to interact with the user interface device and programmed with a design tool configured to combine electronic circuitry with mechanical structures for use with designing hybrid electro-mechanical three-dimensional circuits for 3D printed devices;
   wherein the design tool is configured to facilitate creation and placement of components and traces, and print preparation for additive manufacturing systems, including auto-routing of a trace path to maximize portions of the trace that lie in the same 3D-printing slices.

2. The system of claim 1, wherein the design tool is configured to enable a user to create a trace in a three dimensional model by freehand drawing or by clicking on control maps.

3. The system of claim 2, wherein the design tool is configured to position and orientate electronic components in relation to the three dimensional model using ray casting.

4. The system of claim 3, wherein the design tool is configured to create the trace on a surface of the three dimensional model, or aligned to a given slice plane within the three dimensional model, using interpolation.

5. The system of claim 4, wherein the design tool is configured to orient traces or components to a user defined grid of planes, and wherein the electronic circuitry is formed using silver ink and where in the mechanical structures are formed using plastic.

6. A method comprising:
   providing, using a computing device, a design tool comprising a database of components for placement in a model;
   receiving, using the computing device, user input comprising a selection of one or more of the components from the database and one or more corresponding locations for placement of the one or more components in the model;
   placing one or more electrical traces in the model, including aligning the one or more electrical traces to a user defined slice plane within the model; and
   storing a geometry of the model, wherein the stored geometry comprises structural components, electrically conductive components, and electrical traces.

7. The method of claim 6, wherein receiving the user input comprises a selection of two or more of the components from the database, and
   wherein placing one or more electrical traces comprises receiving, using the computing device, user input placing the one or more electrical traces to connect the two or more components.

8. The method of claim 6, wherein placing one or more electrical traces comprises:
   receiving two or more control points; and
   mapping a trajectory for the one or more traces to the user adjustable slice plane within the model based on the two or more control points.

9. The method of claim 8, further comprising interpolating the trajectory based on the received two or more control points.

10. The method of claim 6, wherein placing one or more electrical traces comprises automatically placing, using the computing device, one or more electrical traces to connect two or more components.

11. The method of claim 10, wherein each electrical trace is automatically placed after a user selects two components from the selected two or more components.

12. The method of claim 11, further comprising, after automatically placing a first electrical trace, receiving a user input to re-shape the first electrical trace.

13. The method of claim 6, wherein the user defined slice plane is a first slice plane, the method further comprising receiving user input defining a second slice plane, and wherein placing one or more electrical traces comprises constraining at least one electrical trace based on the first slice plane and the second slice plane.

14. The method of claim 6, wherein each electrical trace is discretized into a discrete series of layers for the stored geometry, and anti-aliasing is used for each electrical trace.

15. The method of claim 14, further comprising receiving user input that sets an orientation of a normal direction of the user defined slice plane.

16. The method of claim 15, wherein the orientation of the normal direction is changed from a usual orientation along a z dimension of a three dimensional printer.

17. The method of claim 16, further comprising, wherein where two consecutive trace slices are on different slice planes, re-positioning the two consecutive trace slices to maintain electrical contact between the two consecutive trace slices.

18. A method comprising:
providing, using a computing device, a design tool comprising a database of components for placement in a model;
receiving, using the computing device, user input comprising a selection of one or more of the components from the database and one or more corresponding locations for placement of the one or more components in the model;
placing electrical traces in the model, including dynamically adjusting an amount of overlap between two consecutive trace slices based on material and fabrication properties; and
storing a geometry of the model, wherein the stored geometry comprises structural components, electrically conductive components, and electrical traces.

19. The method of claim 18, further comprising storing electrical characteristics of each of the selected one or more components.

20. The method of claim 18, further comprising storing meta data relating to the physical appearance of each of the selected one or more components.

21. The method of claim 18, further comprising:
determining an orientation of a first component among the selected one or more components; and
changing the orientation of a second component among the selected one or more components based on the determined orientation of the first component.

22. The method of claim 21, further comprising, in response to changing the orientation of the second component, automatically changing a layout of at least one of the electrical traces in the model.

23. The method of claim 22, wherein automatically changing a layout comprises optimizing for electromagnetic characteristics.

24. The method of claim 18, wherein the selected one or more of the components from the database are automatically orientated on the model based on a surface of the model.

* * * * *